United States Patent
Rohatschek et al.

(10) Patent No.: US 9,678,917 B2
(45) Date of Patent: Jun. 13, 2017

(54) COMMUNICATIONS ASSEMBLY HAVING LOGIC MULTICHANNEL COMMUNICATION VIA A PHYSICAL TRANSMISSION PATH FOR SERIAL INTERCHIP DATA TRANSMISSION

(75) Inventors: Andreas-Juergen Rohatschek, Wernau/Neckar (DE); Dieter Thoss, Schwieberdingen (DE); Thorsten Huck, Murr (DE); Stoyan Todorov, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 582 days.

(21) Appl. No.: 14/346,943

(22) PCT Filed: Aug. 6, 2012

(86) PCT No.: PCT/EP2012/065331
§ 371 (c)(1),
(2), (4) Date: Jul. 11, 2014

(87) PCT Pub. No.: WO2013/045146
PCT Pub. Date: Apr. 4, 2013

(65) Prior Publication Data
US 2014/0325104 A1    Oct. 30, 2014

(30) Foreign Application Priority Data
Sep. 27, 2011   (DE) .......... 10 2011 083 476

(51) Int. Cl.
*G06F 13/24* (2006.01)
*G06F 13/42* (2006.01)

(52) U.S. Cl.
CPC .......... *G06F 13/4256* (2013.01); *G06F 13/24* (2013.01); *G06F 13/4247* (2013.01); *G06F 13/4282* (2013.01)

(58) Field of Classification Search
CPC ............ G06F 13/4256; G06F 13/4247; G06F 13/4282; G06F 13/24
See application file for complete search history.

(56) References Cited

U.S. PATENT DOCUMENTS

| | | | |
|---|---|---|---|
| 2002/0138156 A1* | 9/2002 | Wong .................... | G06F 9/4405 700/8 |
| 2005/0273539 A1 | 12/2005 | Yamamoto | |
| 2008/0005428 A1* | 1/2008 | Maul ..................... | G06F 13/426 710/62 |
| 2012/0076146 A1* | 3/2012 | Rohatschek .......... | H04L 12/422 370/392 |

FOREIGN PATENT DOCUMENTS

CN         1604536 A       4/2005

OTHER PUBLICATIONS

International Search Report for PCT/EP2012/065331, dated Oct. 24, 2012.

* cited by examiner

*Primary Examiner* — Glenn A Auve
(74) *Attorney, Agent, or Firm* — Norton Rose Fulbright US LLP; Gerard Messina

(57) ABSTRACT

In a communications assembly having multiple users, one user is designated as a master and additional users are designated as peripheral modules, at least two of the peripheral modules as well as at least two interface modules are integrated into a shared physical implementation unit, and at least one interface module, which is designated as a slave, is unambiguously assigned to each of the at least two peripheral modules.

16 Claims, 3 Drawing Sheets

(Related Art)

COMMUNICATIONS ASSEMBLY HAVING LOGIC MULTICHANNEL COMMUNICATION VIA A PHYSICAL TRANSMISSION PATH FOR SERIAL INTERCHIP DATA TRANSMISSION

BACKGROUND OF THE INVENTION

1. Field of the Invention

The present invention relates to a communications assembly and a method for exchanging data.

2. Description of the Related Art

In the field of automotive engineering, serial interfaces (for example, SPI, serial peripheral interface) are used in control units for data transmission between logic modules which may be designed as integrated circuits (IC), for example. The SPI standard describes a bidirectional, synchronous and serial data transmission between a module designated as a master and various modules designated as slaves. An interface includes at least three lines between the master and a slave, generally two data lines and one clock line. When there are multiple slaves, each of these modules requires an additional selection line from the master. The SPI interface permits the implementation of a daisy chain or bus topology.

In some cases, the SPI interface is not suitable for transmission of time-critical trigger signals to meet the real-time requirements of today's safety-critical applications. Frequently there is merely an exchange of diagnostic and status information using an SPI. Time-critical trigger signals are generally transmitted to the trigger modules of the actuators and/or evaluation circuits of the sensors using timer units and/or proprietary interfaces with great complexity.

The use of the SPI interface in the form of a bus topology results in progressively worse signal integrities at higher data rates and strong interference effects due to inferior EMC properties. In addition, only the transmission signal is transmitted in synchronization with the clock signal, whereas the phase-locked transmission of the reception signal becomes increasingly more difficult at high data rates due to the internal lag times in the slave, possibly causing errors in the data transmission. When using the SPI interface in a daisy-chain topology, i.e., in a ring topology, very long latency times occur, which is why such a configuration cannot be used efficiently in automotive control units.

According to the related art, an SPI interface offers no possibility for transmission of interrupts (interrupt queries) to the master. For this purpose, the SPI master must pose a query to the slave at defined intervals, for example, a read command for readout of new data (so-called polling). Another remedy is offered by an additional interrupt line, but this increases the wiring complexity and the number of pins, so it is not economical.

BRIEF SUMMARY OF THE INVENTION

With the present invention, a logic multichannel communication via a shared physical transmission path may be enabled for serial interchip data transmission. Data may be transmitted here between users situated in a serial and/or ring-type configuration in a communications assembly.

In one embodiment of the present invention, integration of multiple users designated as slaves of a communications assembly designed as a ring, for example, is provided on a physical implementation unit, for example, a logic module designed as a semiconductor and/or an ASIC (application-specific integrated circuit) in order to thereby supply a plurality of separate interrupt signals for communication with a user designated as a master for these slaves of this shared implementation unit which are provided as function units.

Logic communication channels for a method for transmission of data between users in the ring-type communications assembly may thus be provided over a shared physical transmission path, which may be implemented via a shared interface of multiple slaves, so that there may be a simple and inexpensive implementation on the physical implementation unit up to high data rates. This concept is suitable for a uniform design of an interface module in a microcontroller (master) including a software layer in alternative hardware partitioning.

In this embodiment, an individual interrupt signal is provided on the shared physical implementation unit for each logic function unit with integration of multiple function units. In addition, a flexible distribution of peripheral modules among multiple ASICs may be provided, so that optimization of the hardware partitioning with regard to an optimal distribution of the power loss in a control unit may be achieved along with an increase in the scalability of product variants of the system to be presented, including the communications assembly.

Consequently, with this method, multiple logic communication channels may be made available for data transmission over a shared physical transmission path between logic modules within a control unit on the basis of a ring-type communications assembly. Due to the ring topology, the users are connected by point-to-point links having a low number of pins. A user designed as a microcontroller is provided as the master, so that bus arbitration is not necessary. Multiple slaves are situated here on a discrete module (ASIC). At least one slave as a user may be controlled by a master as the logic, so the master is sending a continuous data stream. Due to the possibility of continuous synchronization to the line-coded data signal, the slaves also no longer require an additional local clock pulse.

In another embodiment of the present invention, it is possible to transfer data between users of a serial ring-type communications assembly, for example, a so-called ring bus, via which the users are serially connected to one another. A data packet may be transferred from one user designated as a master to additional users designated as slaves, the data packet being transferred from slave to slave. Data may be transferred from user to user with a delay of one bit period, so that data packets which may contain messages may be transferred among the users with a very low latency. In each user, the data packets are thus relayed with a delay to the next user via a one-bit shift register.

In contrast with the related art, the serial ring-type communications assembly used here offers a possibility for issuing soft interrupts (interrupt queries). To be able to receive information and/or interrupt queries from the slaves during idling of the master, i.e., the latter does not have any messages to send, the master continuously sends so-called blank frames. Polling of the slaves is thus conducted by sending the blank frames, which are also known as idle frames. Each slave may occupy a blank frame and transfer its data and/or at least a request as a so-called "soft interrupt" and thus as an interruption of the software in response to the polling. Due to the integration of multiple users on a physical implementation unit, multiple peripheral modules have the option of transmitting a separate interrupt query to the user designated as the master via the shared serial data interface. The user designated as the master may respond to the interrupt queries of a slave with a suitable service routine. For example, a DMA functionality for implementation of a direct memory access integrated into the memory access module of the user designated as a master permits direct transfer of received data to the memory.

The communications assembly according to the present invention is designed to carry out all steps of the method presented here. Individual steps of this method may also be carried out by individual components of the communications assembly. In addition, functions of the communications assembly or functions of individual components of the communications assembly may be implemented as steps of the method. Furthermore, it is possible for steps of the method to be implemented as functions of at least one component of the communications assembly or of the entire communications assembly.

Additional advantages and embodiments of the present invention are derived from the description and the accompanying drawings.

It shall be understood that the features mentioned above and those yet to be explained below may be used not only in the particular combination given but also in other combinations or alone without departing from the scope of the present invention.

DETAILED DESCRIPTION OF THE INVENTION

Figure 1:
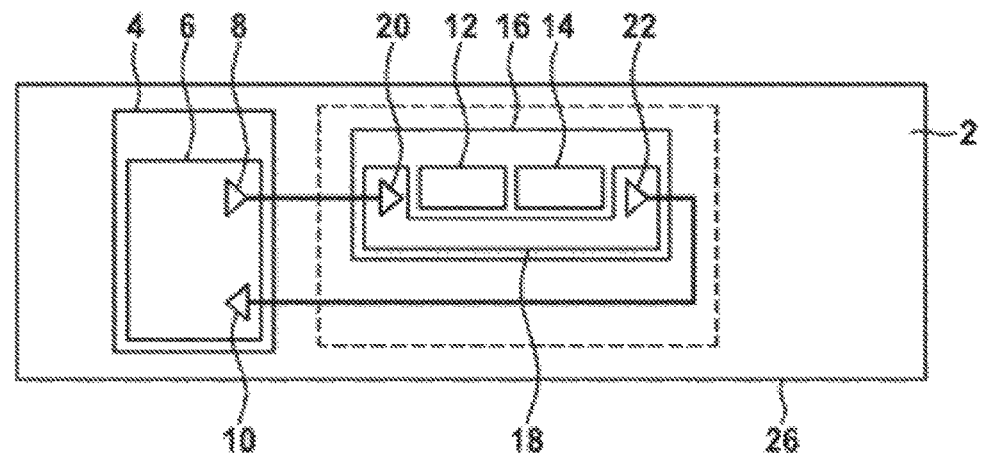
FIG. 1 shows in a schematic diagram an example of a first communications assembly known from the related art in a ring topology in which the external peripheral modules are accommodated on a physical implementation unit.

A communications assembly 2 known from the related art is schematically shown in FIG. 1. This communications assembly 2 includes as users a master 4, designed here as a microcontroller, and an interface 6 for a serial, ring-type communications assembly 2 having an output 8 and an input 10. As additional users, communications assembly 2 has a data interface 18 designated as a slave as well as a first peripheral module 12 and a second peripheral module 14. An application-specific integrated circuit 16 (ASIC) includes shared serial data interface 18, which is designated as a slave and is suitable for a serial ring network for the two peripheral modules 12, 14. Data interface 18 designated as a slave has an input 20 and an output 22.

The aforementioned users of communications assembly 2, i.e., master 4 and data interface 18 designated as a slave, are connected in series. Furthermore, it is provided that a plurality of peripheral modules 12, 14 is integrated into the application-specific integrated circuit 16 (ASIC) as a shared physical implementation unit for these peripheral modules 12, 14 via the slave as components of this circuit. The two peripheral modules 12, 14 may communicate with master 4 via shared data interface 18. Communications assembly 2 may be designed as a component of a control unit 26, for example. FIG. 1 thus represents a possible hardware partitioning of this control unit 26. In an extension of the exemplary diagram in FIG. 1, communications assembly 2 may also have additional peripheral blocks as well as any number of peripheral modules for each block.

Figure 2:
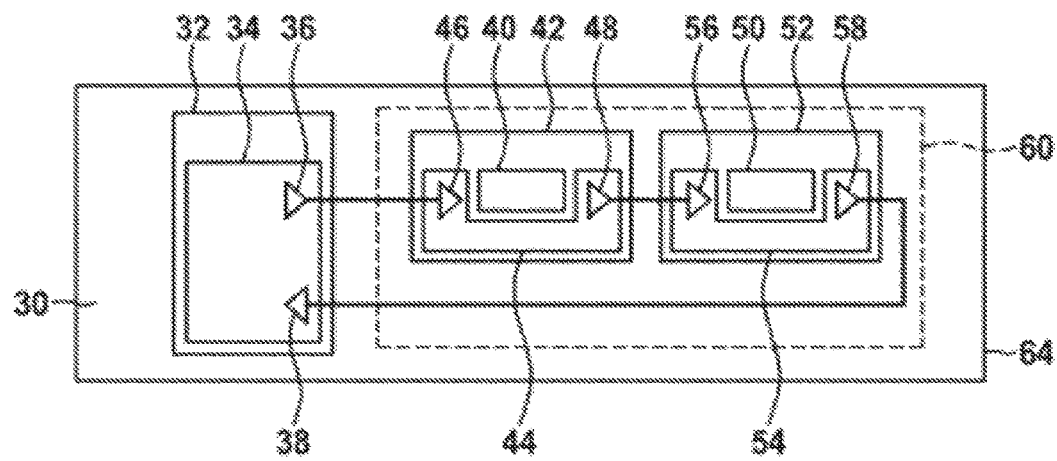
FIG. 2 shows in a schematic diagram an example of a second communications assembly known from the related art in a ring topology in which the external peripheral modules are accommodated on different physical implementation units.

FIG. 2 schematically shows another communications assembly 30 known from the related art. This communications assembly 30 includes as users a master 32, which is designed here as a microcontroller and a serial data interface 34 having an output 36 and an input 38. Communications assembly 30 also includes as additional users a first user designated as a slave, which includes a peripheral module 40 and is integrated into a first application-specific integrated circuit and thus a first ASIC 42. In addition, a data interface 44, designated as a slave, of the first user, designated as a slave and having an input 46 and an output 48, is integrated into the application-specific integrated circuit. A second user of communications assembly 30, also designated as a slave, is designated as a peripheral module and is integrated into a second application-specific integrated circuit 52, i.e., an ASIC. A data interface 54, designated as a slave, of the second user, designated as a slave which has an input 56 and an output 58, is also integrated into second application-specific integrated circuit 52. It is also provided that communications assembly 30 is designed as a component of a control unit 64.

Communications assembly 30 illustrated in FIG. 2 includes the same scope of function as communications assembly 2 illustrated in FIG. 1. In contrast with the first example of communications assembly 2, the two peripheral modules 40, 50 of communications assembly 30 known from the related art are now situated on two different application-specific integrated circuits 42, 52 and thus on two different silicon surfaces. Both application-specific integrated circuits 42, 52 include an interface 44, 54 for communication with master 32.

An adaptation of the addressing of messages is possible using the software. In addition, there is a difference in the analysis of soft interrupts with the aid of which a user designated as a slave is able to transmit an interrupt query to the user designated as a master 4, 32. Each user designated as a slave may place an interrupt query to master 32 in communications assembly 30 in contrast with communications assembly 2. By dividing peripheral modules 40, 50 among different ASICs 42, 52 each having corresponding interfaces 44, 54, these now have separate soft-interrupt channels.

Figure 3:
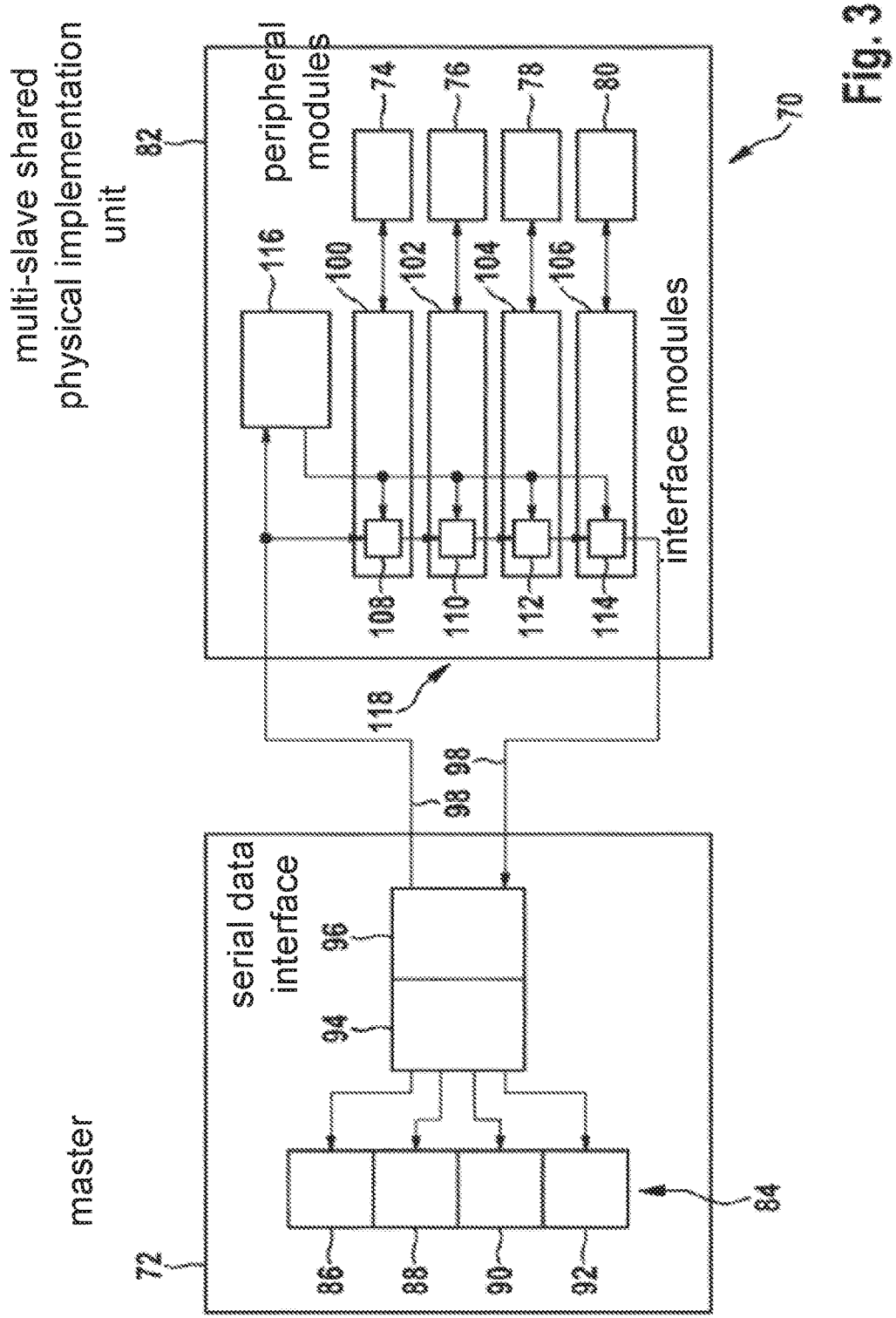
FIG. 3 shows in a schematic diagram a first specific embodiment of a communications assembly according to the present invention.

The first specific embodiment of a communications assembly 70 according to the present invention, which is illustrated schematically in FIG. 3, includes a communications user 72, which is designated as a master, as well as a communications user 82, which is designated as a multi-slave and includes, for example, a first peripheral module 74, a second peripheral module 76, a third peripheral module 78 and a fourth peripheral module 80, all peripheral modules 74, 76, 78, 80 being integrated into a shared physical implementation unit 82, which may also be referred to as a so-called multi-slave. All users here form a ring-type serial communications assembly 70. In the present specific embodiment, communication user 72, which is designated as a master, has a memory area 84 designed as a RAM having a first sector 86, a second sector 88, a third sector 90 and a fourth sector 92. Sectors 86, 88, 90, 92 are connected to a serial data interface 96 of the user designated as a master 72 via a memory access module 94 (DMA, direct memory access), this interface also being connected via a physical data line 98 to physical implementation unit 82 which includes peripheral modules 74, 76, 78, 80 and at least two interface modules, here four interface modules 100, 102, 104, 106.

A separate serial interface module 100, 102, 104, 106, designated as a slave and having a one-bit shift register 108, 110, 112, 114 is usually assigned to each peripheral module 74, 76, 78, 80. Interface modules 100, 102, 104, 106 are thus users of communications assembly 70 designated as slaves in the specific embodiment described here. Interface modules 100, 102, 104, 106 designated as slaves are connected to one another via one-bit shift registers 108, 110, 112, 114. All interface modules 100, 102, 104, 106 designated as slaves form a shared serial data interface 118 via which peripheral modules 74, 76, 78, 80 are connected serially to the user designated as a master 72 as an additional user 72. Furthermore, implementation unit 82 has a shared clock recovery module 116 for all interface modules 100, 102, 104, 106 of shared serial data interface 118 and/or for all peripheral modules 74, 76, 78, 80.

The multi-slave shown in FIG. 3 includes multiple logic interface modules 100, 102, 104, 106 as well as peripheral modules 74, 76, 78, 80, which are implemented on a physical module (ASIC), here the shared physical implementation unit 82. In a communication, the latency increases only slightly due to a one-bit delay provided per user and is therefore negligible. Within the multi-slave, interface modules 100, 102, 104, 106 are assigned as slaves to different peripheral modules 74, 76, 78, 80. It is also apparent from FIG. 3 that only the logic of interface modules 100, 102, 104, 106 including one-bit shift registers 108, 110, 112, 114 is reserved in multiples. Clock recovery module 116 is provided only once on the peripheral implementation unit 82 and is utilized jointly by peripheral modules 74, 76, 78, 80 as well as interface modules 100, 102, 104, 106 designated as slaves.

In another possible embodiment of the present invention, at least one peripheral module 74, 76, 78, 80 may be assigned to at least one interface module 100, 102, 104, 106. It is thus possible that two or more peripheral modules 74, 76, 78, 80 are connected to master 72 via one interface module 100, 102, 104, 106.

Each interface module 100, 102, 104, 106 has an opportunity to transmit a separate interrupt query to the user designated as a master 72 via shared serial data interface 118. The user designated as a master 72 may react with a suitable service routine to the interrupt queries of one interface module 100, 102, 104, 106. For example, a DMA functionality integrated into memory access module 94 of the user designated as a master 72 for implementation of direct memory access permits a predefined message to be sent through data interface 96 of master 72 after an interrupt query, e.g., a read command, and the resulting data to be transmitted directly into the memory of master 72, designed as a microcontroller.

In an alternative hardware partitioning, if peripheral modules 74, 76, 78, 80 are now divided among different modules, the interrupt channels are still assigned as slaves to interface modules 100, 102, 104, 106. This does not result in any change in the software since the addressing of the users designated as slaves as well as the interrupt channels remain correctly assigned as long as the order of the users is not altered.

Figure 4:
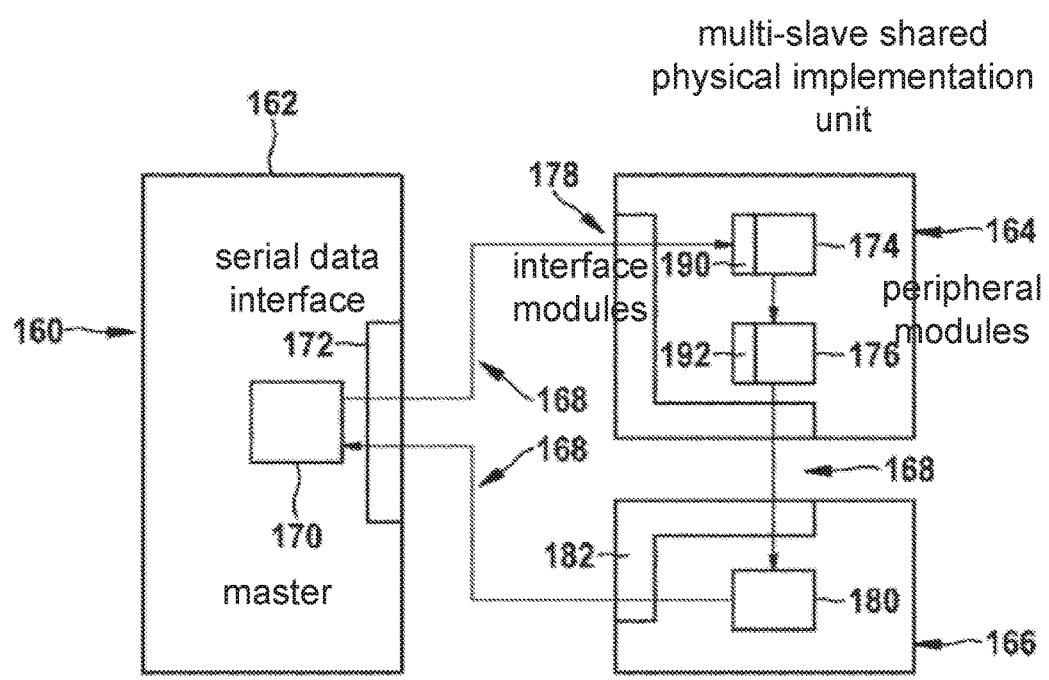
FIG. 4 shows in a schematic diagram a second specific embodiment of a communications assembly according to the present invention.

A second specific embodiment of ring-type communications assembly 160 according to the present invention is schematically shown in FIG. 4. This communications assembly 160 includes three physical implementation units 162, 164, 166, which are interconnected to one another in a ring via sections 168 of a data link. It is provided here that a user of ring-type communications assembly 160 designated as a master 170 is integrated into first physical implementation unit 162. In addition, a serial data interface 172 of master 170 is integrated into the first implementation unit. Two users designated as peripheral modules 174, 176 and two interface modules 190, 192 are integrated jointly into second implementation unit 164. Interface modules 190, 192 are connected in series along the ring-type communications assembly on second implementation unit 164, one interface module 190, 192 designated as a slave being unambiguously assigned to each peripheral module 174, 176. In the specific embodiment described here, slaves of communications assembly 160 are designed as interface modules 190, 192. One module, which is possibly used jointly for clock recovery in accordance with module 116 in FIG. 3, is not shown here.

On the third implementation unit 166 of communications assembly 160, just one user designated as a slave 180 is integrated into an assigned serial data interface 182. The second specific embodiment of communications assembly 160 according to the present invention, which is presented on the basis of FIG. 4, shows that it has at least one physical implementation unit 164 into which at least two peripheral modules 174, 176, each usually connected in series and each having one interface module 190, 192 unambiguously assigned, are integrated as slaves. Furthermore, communications assembly 160 according to the present invention also has a physical implementation unit 166 into which just one slave is integrated.

All specific embodiments of ring-type communications assembly 70, 160 presented here have multiple users, one user being designated as master 72, 170 and additional users being designated as peripheral modules 74, 76, 78, 80, 174, 176, at least two peripheral modules 74, 76, 78, 80, 174, 176 being integrated into a shared physical implementation unit 82, 164. In the specific embodiments shown here, one interface module 100, 102, 104, 106, 190, 192 is unambiguously assigned to each of the at least two peripheral modules 74, 76, 78, 80, 174, 176.

At least two peripheral modules 74, 76, 78, 80, 174, 176 may be connected to master 72, 170 via a shared serial data interface 118, 178, whereby shared serial data interface 118, 178 may also be integrated into shared physical implementation unit 82, 164.

Alternatively or additionally, it is possible for shared data interface 118 to have at least one interface module 100, 102, 104, 106, 190, 192, at least one peripheral module 74, 76, 78, 80, 174, 176 being assigned to at least one interface module 100, 102, 104, 106, 190, 192 and being designated as a slave.

In a method for exchanging data between users of communications assemblies 70, 160 under discussion, data are exchanged between at least two peripheral modules 74, 76, 78, 80, 174, 176 and master 72, 170 via shared serial data interface 118, 178.

A logic communication channel is made available for each of the at least two peripheral modules 74, 76, 78, 80, 174, 176 via shared data interface 118, 178. Furthermore, each of the at least two peripheral modules 74, 76, 78, 80, 174, 176 may communicate separately with master 72, 170.

In exchanging data between each of the at least two peripheral modules 74, 76, 78, 80, 174, 176 and master 72, 170, separate interrupt signals (interrupt queries) may be used, which peripheral modules 74, 76, 78, 80, 174, 176 issue via separate interrupt channels. One such separate interrupt channel may be provided via one interface module 100, 102, 104, 106, 190, 192 that is assigned to peripheral module 74, 76, 78, 80, 174, 176. Furthermore, the data to be exchanged may be synchronized continuously.

The integration of multiple peripheral modules 74, 76, 78, 80, 174, 176 into one implementation unit 82, 164 yields the result that multiple interrupts may be made available for one user. On the other hand, functions on a silicon surface, for example, may be partitioned variably without requiring changes in the software. One boundary condition is the ring topology of communications assembly 70, 160 provided for this purpose.

What is claimed is:

1. A communications system having multiple users, comprising:
   one user being designated as a master;
   additional users being designated as peripheral modules; and
   multiple interface modules;
   wherein at least two of the peripheral modules and at least two interface modules are integrated into a shared integrated circuit, and wherein at least one interface module which is designated as a slave is unambiguously assigned to each of the at least two peripheral modules.

2. The communications system as recited in claim 1, wherein the communications system is configured in the form of a ring in which the users are serially connected to one another.

3. The communications system as recited in claim 2, wherein the at least two peripheral modules are connected to the master via a shared physical data interface.

4. The communications system as recited in claim 3, wherein the shared physical data interface includes the interface modules which are assigned to the at least two peripheral modules.

5. The communications system as recited in claim 3, wherein at least one of the two peripheral modules integrated into the shared integrated circuit has a separate interrupt channel provided via the assigned interface module for issuing soft interrupts.

6. The communications system as recited in claim 1, wherein the shared integrated circuit is a single application-specific integrated circuit (ASIC).

7. A method for operating a communications assembly having multiple users, the method comprising:
   designating one user as a master;
   designating additional users as peripheral modules;
   integrating at least two of the peripheral modules and at least two interface modules into a shared integrated circuit;
   unambiguously assigning at least one interface module, which is designated as a slave, to each of the at least two peripheral modules; and
   exchanging data between the users.

8. The method as recited in claim 7, wherein the data are exchanged between the at least two peripheral modules and the master via a shared data interface of the at least two peripheral modules.

9. The method as recited in claim 8, wherein a logic communication channel is provided for each of the at least two peripheral modules via the shared data interface.

10. The method as recited in claim 9, wherein the exchanged data are transferred continuously.

11. The method as recited in claim 7, further comprising providing, in at least one of the two peripheral modules integrated into the shared integrated circuit, a separate interrupt channel via the assigned interface module for issuing soft interrupts.

12. The method as recited in claim 7, wherein the shared integrated circuit is a single application-specific integrated circuit (ASIC).

13. A communications system having multiple users, comprising:
    one user being designated as a master;
    additional users being designated as peripheral modules; and
    multiple interface modules;
    wherein at least two of the peripheral modules and at least two interface modules are integrated into a shared physical implementation unit, wherein at least one interface module which is designated as a slave is unambiguously assigned to each of the at least two peripheral modules, wherein the at least two peripheral modules are connected to the master via a shared physical data interface, and wherein the shared physical data interface includes the interface modules which are assigned to the at least two peripheral modules.

14. The communications system as recited in claim 13, wherein the communications system is configured in the form of a ring in which the users are serially connected to one another.

15. A communications system having multiple users, comprising:
    one user being designated as a master;
    additional users being designated as peripheral modules; and
    multiple interface modules;
    wherein at least two of the peripheral modules and at least two interface modules are integrated into a shared physical implementation unit, wherein at least one interface module which is designated as a slave is unambiguously assigned to each of the at least two peripheral modules, and wherein at least one of the two peripheral modules integrated into the shared implementation unit has a separate interrupt channel provided via the assigned interface module for issuing soft interrupts.

16. The communications system as recited in claim 15, wherein the at least two peripheral modules are connected to the master via a shared physical data interface.

* * * * *